United States Patent [19]
Staggl et al.

[11] Patent Number: 4,793,203
[45] Date of Patent: Dec. 27, 1988

[54] ROBOT ARM

[75] Inventors: Roland Staggl, Wetter; Manfred Stöber, Witten; Hartwig Sprung, Wetter, all of Fed. Rep. of Germany

[73] Assignee: Mannesmann Aktiengesellschaft, Dusseldorf, Fed. Rep. of Germany

[21] Appl. No.: 94,825

[22] Filed: Sep. 9, 1987

[30] Foreign Application Priority Data

Sep. 9, 1986 [DE] Fed. Rep. of Germany ....... 3631024

[51] Int. Cl.⁴ .................. B25J 17/02; B25J 18/00
[52] U.S. Cl. .................. 74/479; 174/110 FC; 174/110 F; 248/51; 414/918; 901/21; 901/23; 901/29; 901/50
[58] Field of Search ....... 74/479; 174/110 F, 110 FC; 901/21, 23, 29, 50; 414/918; 248/51, 52

[56] References Cited

U.S. PATENT DOCUMENTS

| | | | |
|---|---|---|---|
| 3,247,978 | 4/1966 | Neumeier | 901/21 X |
| 3,906,323 | 9/1975 | Ono et al. | 901/29 |
| 3,959,608 | 5/1976 | Finlayson et al. | 414/918 X |
| 4,218,166 | 8/1980 | Abu-Akeel et al. | 901/21 X |
| 4,423,282 | 12/1983 | Suzuki et al. | 174/110 F X |
| 4,427,170 | 1/1984 | Truninger | 248/51 |
| 4,636,138 | 1/1987 | Gorman | 901/21 X |
| 4,712,972 | 12/1987 | Nakashima et al. | 901/50 |

FOREIGN PATENT DOCUMENTS

| | | | |
|---|---|---|---|
| 163898 | 3/1954 | Australia | 174/110 FC |
| 2717870 | 4/1977 | Fed. Rep. of Germany . | |
| 8401536 | 4/1984 | PCT Int'l Appl. | 901/29 |

Primary Examiner—Allan D. Herrmann
Attorney, Agent, or Firm—Nils H. Ljungman

[57] ABSTRACT

The invention relates to a robot arm with a work arm connected to it, a connector moved by motors for tools, workpieces, workpiece grippers or gripper change systems, whereby the motors are located at the end of the work arm opposite the connector, and are connected by output connections with gear wheels mounted in a swiveling axis of a swiveling head of the connector. To make such a robot arm flexible, and moreover to guarantee that the work arm is rigid, it is proposed that the axes (D,E,P) of rotation of the elements (work arm 2, swiveling head 23, connector 3) intersect at a common intersection point (A).

28 Claims, 5 Drawing Sheets

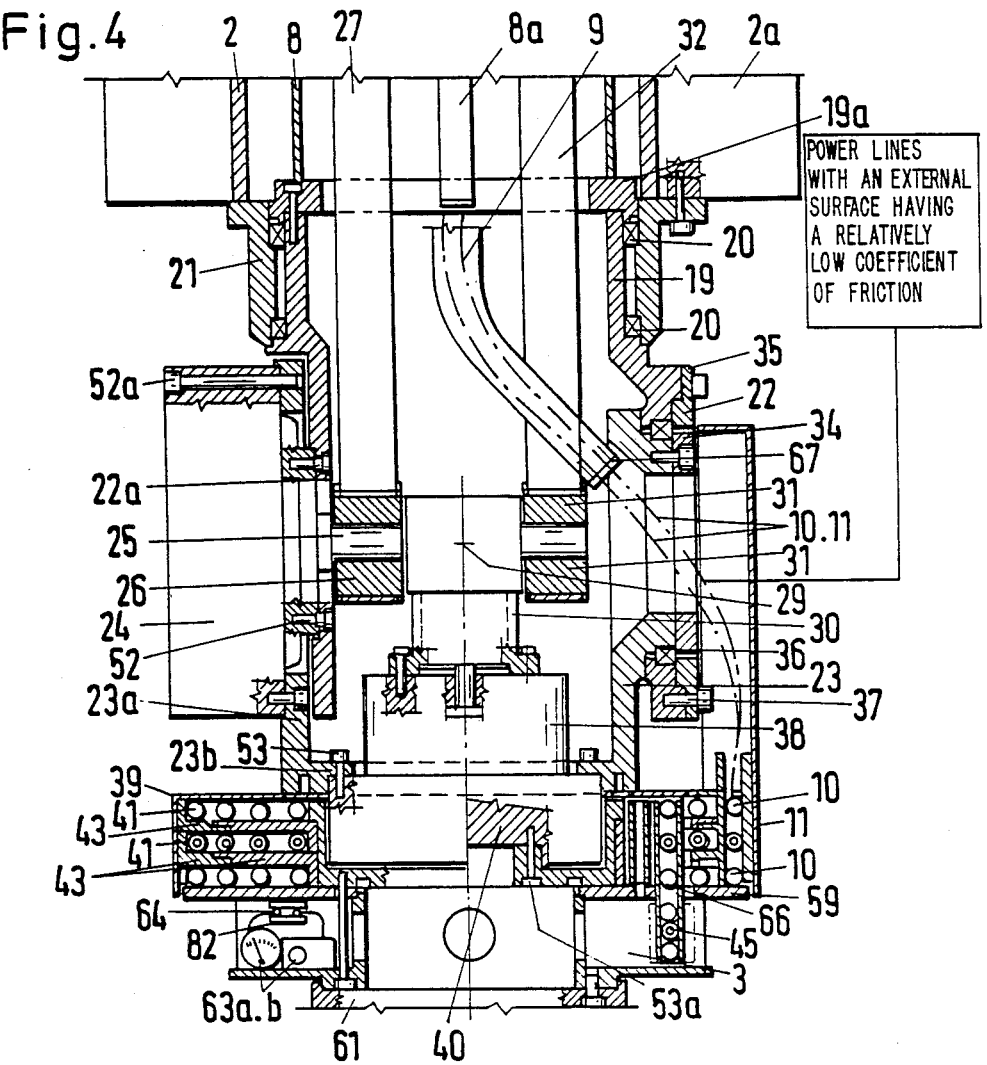
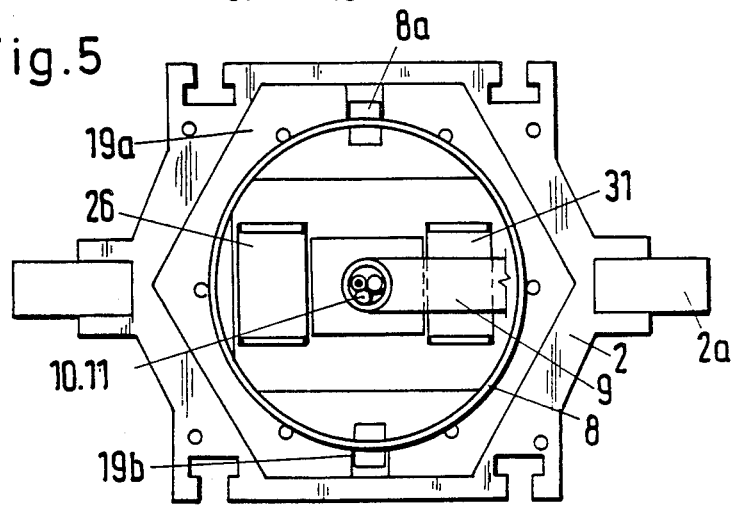

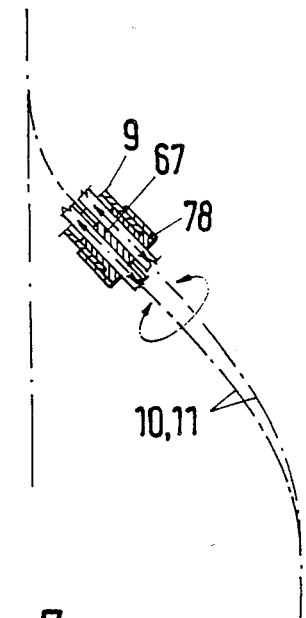
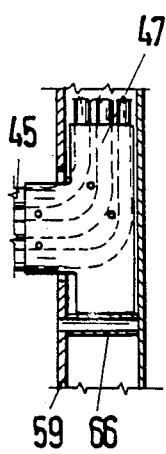
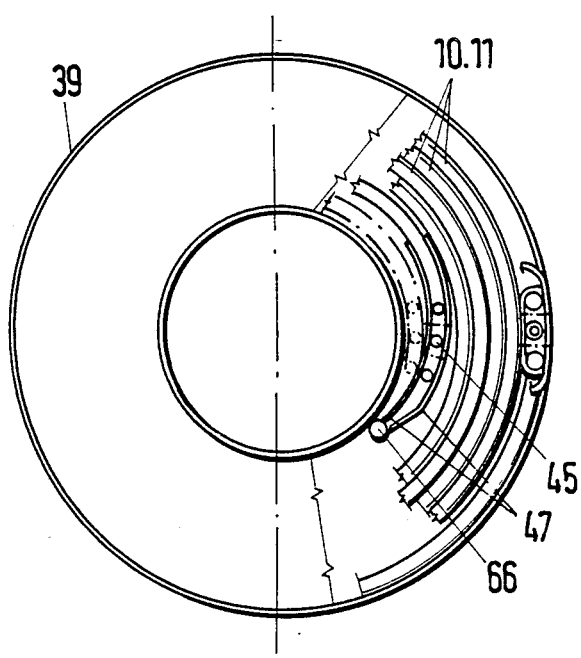
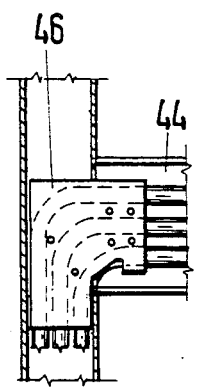

Fig. 10
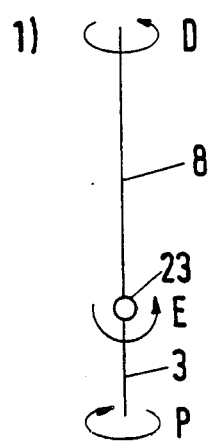
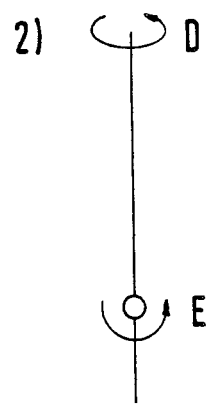
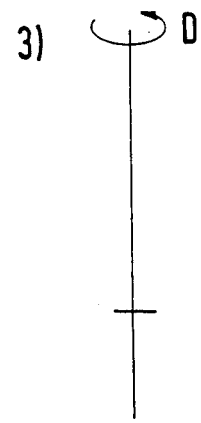
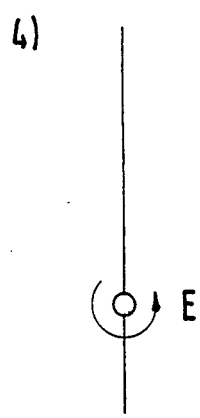
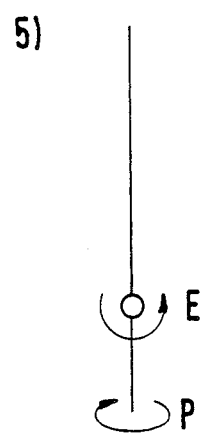
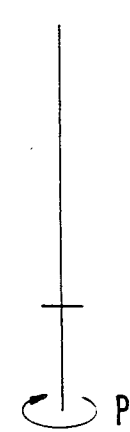
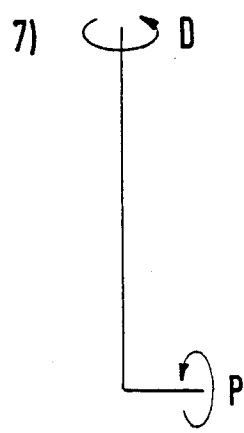
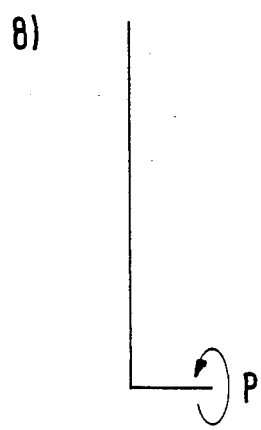
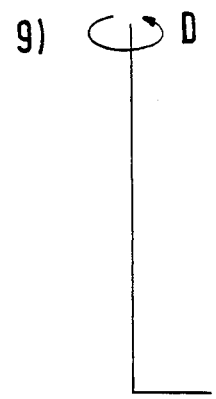

ROBOT ARM

BACKGROUND OF THE INVENTION

1. Field of the Invention

The invention relates to a robot arm with a connector moved by motors and connected to a work arm for tools, workpieces, workpiece grippers or gripper changing systems, whereby the motors are located on the end of the work arm opposite the connector, and are connected by output connections with a gear wheel mounted in a swiveling axis of a swiveling head.

2. Description of the Prior Art

On a robot arm described in German Patent No. DE-PS 27 17 870, the transmission combination of the "E+P" axes is not modular, i.e. it cannot be used flexibly. In addition, the work arm must be designed to be rigid, and therefore a higher profile mass must be rotated around the axis of the work arm. To achieve a specified positioning accuracy, therefore only a limited work stroke is possible in the direction of the "R" axis and an appropriately sized rotary drive is necessary to rotate the work arm around its "D" axis. The designation of the axes is in accordance with VDI Guidelines 2861. These guidelines and the above-cited patents are incorporated herein by reference as if the entire contents thereof were set forth herein.

OBJECT OF THE INVENTION

The object of the invention is therefore to configure the robot arm so that the above-mentioned disadvantages are eliminated.

SUMMARY OF THE INVENTION

This object is achieved in that all the axes of rotation of the elements such as the work arm, in the form of a work arm and a swiveling head, and the connector meet at a common intersection point.

In the invention, the motors are freely accessible, and their weight is supported at one end of the work arm and forms a counterweight to the transport load of the work arm at the connector.

The axis arrangement is designed to take into consideration all the externally-protected power and control lines so that the "D, E and P" axes meet at an intersection, so that during swiveling and rotation of the connector in relation to the extendible column, there is no change in coordinates.

In another configuration of the invention, the work arm is a extendable column which can move on a roller guide. In the extendible column there is a rotating tube which can be rotated by a column rotation motor around a vertical D-axis, and connected to the rotating tube is a rotation fork for a swiveling head designed as a swiveling fork for the connector. On such a extendible column, the weight distribution has a favorable effect, since the column is often mounted in its central area on an overhead transporter. This weight distribution makes possible a rapid start-up of the industrial robot, whose speed of travel reaches 120 m/min. after only 0.5 seconds. With such accelerations, a one-sided weight accumulation would lead to severe loads on the work arm or the extendible column and its bearings. Another advantage is that the rotation drive to rotate the transport load around the D axis must not make the particularly rigid work arm, in the form of a extendible column, rotate with it. It can also be economically sized, even when such a work arm with an extremely long longitudinal stroke is used.

In another configuration of the invention, the output connections are toothed belts, which are guided in gear wheels located in the swiveling axis of the connector. One of these gear wheels is fastened to a drive shaft of a reducer transmission, whose input side is fastened by means of bolts to the rotation fork and whose output side is connected by means of bolts with an arm of the swiveling fork designed as a bolt-on flange. The other toothed belt to rotate the output end of the connector is fastened with a gear wheel on the input shaft of an angle transmission, whose output is in the vertical D-axis of the rotation motor and is connected with a rotation transmission, which is fastened by means of bolts in the flange end of the swiveling fork, and to whose output end the connector is fastened by means of bolts.

The use of high-speed toothed belt has the advantage that any speed differences between the motor output and transmission input caused by any stretching of the toothed belt are greatly reduced.

In another configuration of the invention, the rotation fork connected with the rotation motor is mounted by means of two bearings in the connection end of the extendible column, and the rotation fork has flange holes coaxial to the swiveling axis for mountings of the pivot fork with the connector, so that the two forks stuck laterally into one another are combined into a nonfloating swiveling joint.

In another configuration of the invention, the rotating tube is manufactured from a light alloy and is coupled with simple, bolted and reinforced fitted keys which are engaged in grooves of a flange of the rotation fork and of a connection tube on the opposite drive side. Another advantageous feature of the invention is the location of the transmission motor to rotate the D-axis or of the axis of the rotating tube with the rotation fork between the other drive motors and the connector, and the use of a simple, non-floating toothed belt drive, which acts via a turntable with connection tube and coupling grooves directly on the rotating tube, so that the total length of the work arm remains as low as possible on the one hand, and so that the rotating tube drive remains economical on the other hand.

The power supply for the tool gripper on the connector, in accordance with other features of the invention, is achieved by power lines from a fixed connection point which is located behind a mount as a loop, to a upper rotary line feeder and from the latter through a protecting tube located in the center of the rotating tube through an opening in the pivoting flange of the pivoting fork to a lower rotary line feeder, which surrounds the rotation transmission in an annular fashion. The power lines into the rotary line feeders are preferably designed as flat spirals, between which spacers are located. The power lines can also be wound spirally and located coaxial to one another with different diameters, whereby expandable cylinder jackets are then placed between the individual turns of the spiral, which prevents the individual turns from collapsing and keeps them separate from one another to prevent damage to the lines. The power lines can also be combined with one another into a common flat line, and form several spiral windings standing vertically. When the output end is rotated in relation to the input end of the energy lines in the rotary line feeder, the diameter of the turns either becomes larger or smaller. To make this possible, the windings are located in an annular space, which allows such diameter changes when the hinge or the connector rotates.

According to another feature of the invention, the service life of the spiral-shaped cable, which does not deform plastically, can be significantly increased by having the cables and hoses connected in the area of the cable output from the rotary line feeder by means of a two-piece swiveling clip which can move with the rotary line feeder cover so that a greater minimum bending radius can be used to prevent a cable or hose break, as much as possible.

According to the invention, the hydraulic or pneumatic hose is plastically deformed inside the lower rotary line feeder, and so that its service life can be increased, at least its external skin is made of PTFE or a similar synthetic material with a comparably low coefficient of friction, so that the friction forces of the hose turns among one another are low.

The cables in the vicinity of the lower rotary line feeder also have at least an external skin of PAF or a synthetic material with a similarly low coefficient of friction, e.g. PTFE. Inside these cables, according to the invention, there is insulation and lubrication material in the form of PTFE foamed with air bubbles, so that the cable elasticity achieved in this manner contributes to a particularly long service life.

To achieve an extremely small outside diameter for the lower rotary line feeder, another characteristic of the invention provides that the power and control line cables have an oval cable cross section, and the cable is laid so that the larger cross section height is in the direction of the axis of rotation P.

The rotation compensation for at least 360 degrees is provided in the upper rotary line feeder by means of an elastic band, which supports the individual cables and/or hoses by means of clips, and with its one end is fastened to the outside of the housing of the rotary line feeder and with its other end is fastened to a winding drum, which is again rotated by a driver bushing together with the rotation fork.

The clips are designed in a modular fashion and support the cables and hoses by means of the spirally-laid elastic band, which is guided in a specified, empirically-determined area by means of spacer elements, so that the clips with their connection elements cannot come into contact with one another when the elastic band system contracts, as would be the case with a purely spiral shape. Between the rotary line feeders, there are cable connectors for the different cables.

One advantage of the invention is the overall arrangement of the power and control line components in a modular construction, to compensate for all the movements, in an economically favorable manner, for different application possibilities, e.g. for vertical or horizontal use.

The path of the line between a connection point on the roller guide supporting the work arm and the connector, e.g. to hold a gripper, is divided into two segments.

With a vertically-oriented work arm, power and control lines are economically laid between the connection point of the roller guide and a connection point in the vicinity of the drive motors, and from there, more expensive cable can be laid to another connection point in the connector, because the latter cable is subjected to particularly high stresses inside a compactly-designed rotary line feeder, especially at the connector.

For this reason, above the co-rotating drive motors, there is a rotary line feeder with an elastic band as the cable support, and on the connector there is a line feeder with discs as supports for the individual cables and/or pneumatic or hydraulic hoses.

The linear distance compensation between the connection point on the roller guide and the upper rotary line feeder is guaranteed in a suspended loop by power feed lines or hoses.

The base of the rotary line feeder housing is equipped in its center of rotation above and below with friction bearings, and is inserted between the end walls of the winding drum and the driver bushing so that the rotary line feeder can be driven together with externally-mounted supports, which are connected with the fixed flange holding the column rotation motor, and the co-rotating drive motors can rotate freely.

According to other advantageous features of the invention, the connector has installation points to hold monitoring equipment, such as pressure monitors, valves, connectors for the power and control line, as well as a standardized centering flange, e.g. to hold a change system, so that these components need not be inaccessible from the outside, and the deleterious pressure drop can be kept as low as possible by the shortest possible hose between the pressure monitor and e.g. a suction grip.

The installation points, to simplify installation and maintenance, are freely accessible from the outside, and are protected during operation by a simple protective cover in the form of an elastic film, which is guided by grooves.

By including or omitting axes of rotation or secondary axes of rotation, up to nine different robot variants can be produced.

For the manufacturer and for the operator of industrial robots incorporating the robot arm described in detail here, the invention provides the relatively major advantage of the flexible use of the individual robot arm modules. As required, for retrofits or for modifications, the modular design makes possible nine different models with different axial combinations, using economical replacement modules. For example, the reducer transmission for pivoting can be replaced by a rigid flange, which blocks the rotation fork with the swiveling fork in a required position, and other drive elements of the pivot drive can be eliminated, so that for example, with the connector with two symmetrically-oriented grippers rotating around a vertical axis "P", the result is a gripper change system.

Several embodiments of the invention are illustrated in the accompanying figures and explained in greater detail below.

BRIEF DESCRIPTION OF THE DRAWINGS

FIG. 4 shows the lower swiveling axis of the extendible column shown in FIG. 1, on an enlarged scale, with a lower rotary line feeder;

FIG. 5 shows an overhead view of the apparatus illustrated in FIG. 4;

FIG. 6 shows the lower end of a protective tube with a swiveling bushing for power and control lines;

FIG. 7 shows a partial cross section of the bottom rotary line feeder;

FIG. 8 shows an access opening of the rotary line feeder illustrated in FIG. 7;

FIG. 9 shows cable output of the rotary line feeder shown in FIG. 7; and

FIG. 10 shows nine different combinations of axes of rotation.

DESCRIPTION OF THE PREFERRED EMBODIMENTS

Figure 1:
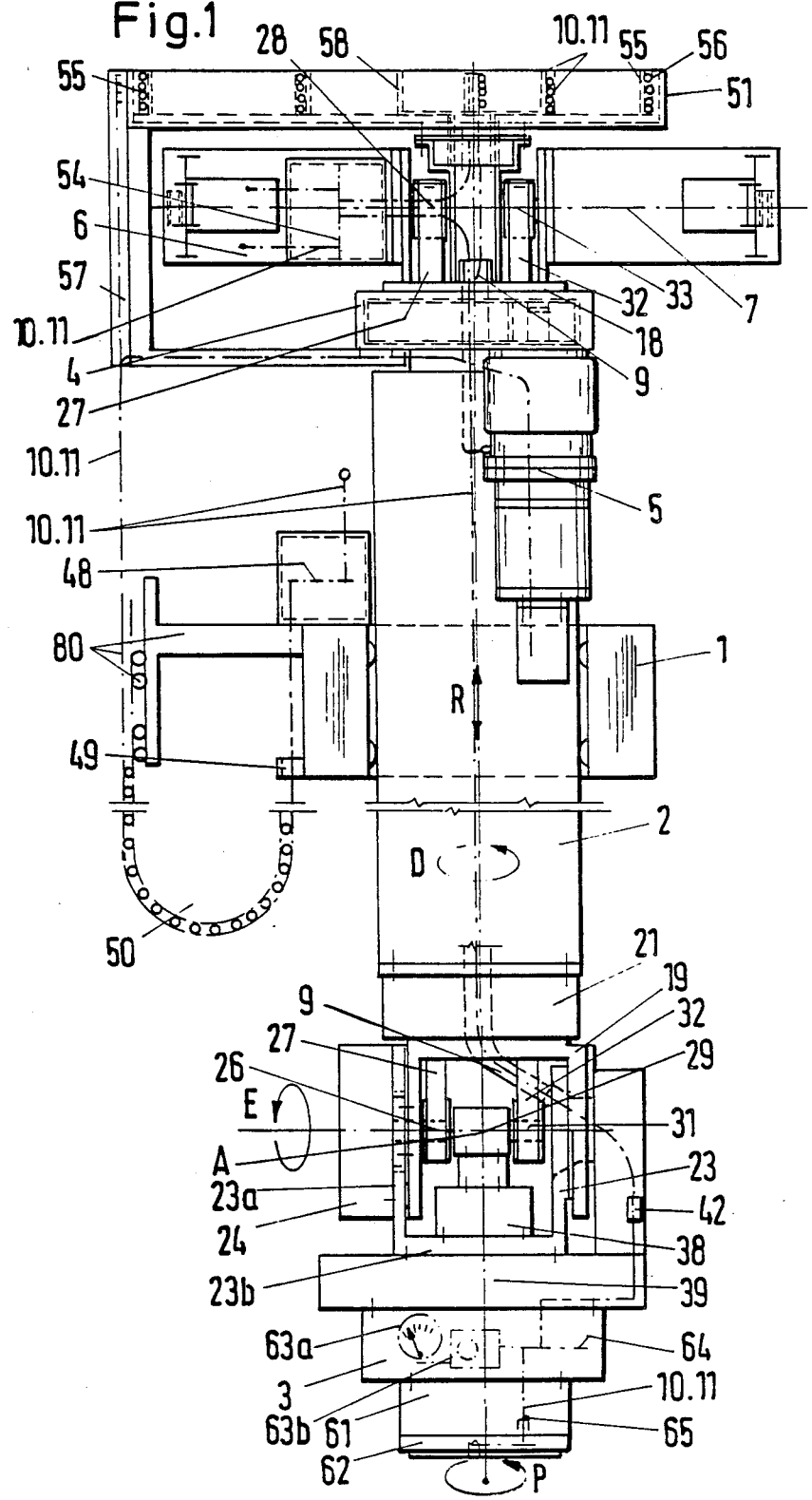
FIG. 1 shows a extendible column of an industrial robot, in a side view.

Guided for movement in both axial directions as indicated by the double ended arrow R on a roller guide 1 of an overhead conveyor (not shown) of an industrial robot, there is a extendible column 2 with a movable connector 3 for vertically-movable grippers and/or tools. The extendible column 2 has, on the upper end, a fixed flange 4 for a column rotation motor 5 for the vertical D-axis of the extendible column 2, a swiveling motor 6 for the rotational raising and lowering of a swiveling fork 23 with the connector 3 around an axis E, and a rotation motor 7 to rotate the connector 3 around the axis of rotation P. FIG. 1 also shows the guidance of power lines 10 and 11 from a connection point 48 via a mount 49, forming a loop 50, past a loop guide 80, to an upper rotary line feeder 51. In a similar fashion, the cables 10 are also guided to the column rotation motor 5. From the toothed wheel 28 of the swiveling motor 6, a toothed belt 27 leads to the toothed wheel 26 of a reducer transmission 24. From the toothed wheel 33 of the rotation motor 7, a toothed belt 32 leads to an input gear wheel 31 of an angular transmission 29, which is connected via a rotation transmission 38 with the connector 3. Some of the power lines 10, 11 lead from the upper rotary line feeder 51 via a connection 54 to a lower rotary line feeder 39.

Figure 2:
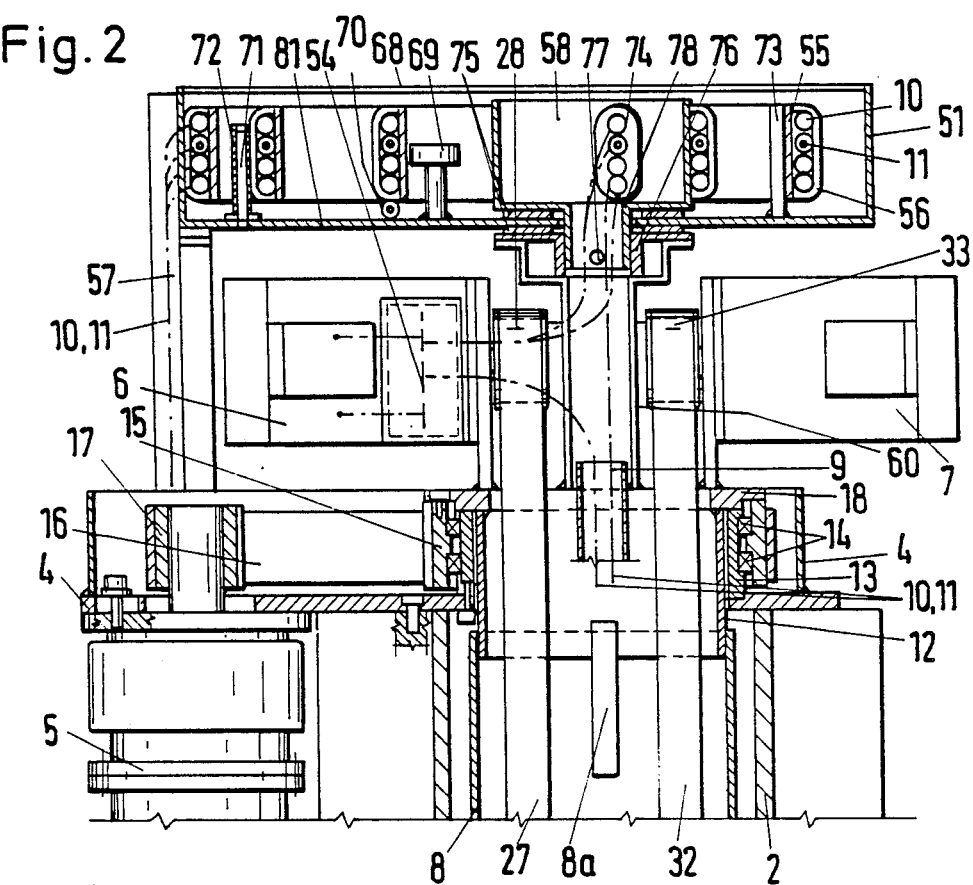
FIG. 2 shows the upper end of the extendible column in longitudinal section with the motors located there and an upper rotary line feeder.

As FIG. 2 shows, in the extendible column 2 there is a rotating tube 8 with a protective tube 9 for the power lines 10 and 11 in the form of two cables and a hose line. The rotating tube 8 is guided at the upper end with a connection tube 12 in a bearing ring 13, which is fastened to the fixed flange 4 for the column rotation motor 5. The bearing ring 13 has two bearings 14 for a toothed disc 15, which is connected via a toothed belt 16 with a toothed wheel 17 of the transmission of the column rotation motor 5. The toothed disc 15 is rotationally-connected with the connection tube 12 and thus with the rotating tube 8.

FIGS. 4 and 5 show the connection of the rotating tube 8 with the lower end by means of a fitted key 8a in a groove 19b of a flange 19a of a rotation fork 19, which is guided by bearing 20 in the connection end 21 of the extendible column 2. The two fork ends of the rotation fork have horizontal holes 22 and 22a lying concentric to one another for the swiveling fork 23 mounted inside, whose one arm 23a is designed as a bolt-on flange for the reducer transmission 24. Its input shaft 25 carries the above-mentioned toothed wheel 26 for the toothed belt 27 guided to the toothed wheel 28 of the pivot motor 6. The rapidly-rotating toothed wheel 26 causes, via the reducer transmission 24 the slow movement of the swiveling fork 23 with the connector 3. The input side of the reducer transmission 24 is connected via bolts 52 with the rotation fork 19, and the output side is connected via bolts 52a with the swiveling fork 23.

In the swiveling fork 23, coaxial to the input shaft 25, there is an angular transmission 29, whose output flange 30 lies in the axis of rotation P of the connector 3. The input toothed wheel 31 of the angular transmission 29 is driven via the above-mentioned toothed belts 32 by the toothed wheel 33 of the rotation motor 7. An annular swiveling flange 34 which partly overlaps a bearing 36 prevents the swiveling fork 23 from sliding out of the rotation fork 19, in whose hole 22 the bearing of an annular retaining flange is secured by means of bolts.

The output flange of the angular transmission 29 is connected with a reducer transmission 38, which is bolted together with the rotary line feeder 39 surrounding the reducer transmission 38 in the lower region, with the flange end 23b of the pivot fork 23 by means of bolts 53. The output shaft 40 of the reducer transmission 38 transmits the rotation of the rotation motor 7 to the flange-like connector 3 for a gripper or similar apparatus.

FIG. 5 shows an overhead view of the apparatus illustrated in FIG. 4, with the extendible column 2 with its guide rails 2a and the rotating tube 8 with the protective tube 9 and the toothed wheels 26 and 31, as well as the connection of the rotating tube 8, via a fitted key 8a with a groove 19b in the flange 19a of the rotation fork 9.

The cable 10 and the hose line 11 guided through the protective tube 9 are guided through the opening of the swiveling flange 34 shown in FIG. 4 into spiral turns as shown in FIGS. 4 to 7. The lower end of the protective tube 9 has a bearing bushing 78 with a swiveling bushing 67, as shown in FIG. 6, to guide the cable 10 and the hose line 11, which can thereby move freely in the longitudinal direction. The two cables 10 and the hose line 11 lie on top of one another in spirals and are separated from one another by spacer rings 43. The access opening 44 provided with a clip 46 is illustrated in FIGS. 7 and 8, and is always located at the same spot on the rotary line feeder 39, while the cable output 45 shown in FIGS. 7 and 9 rotates with the rotating tube 8 and the connector 3.

The right half of FIG. 7 shows the power lines 10 and 11 in expanded spirals. After rotation of the cable output by approximately 390 degrees, the spiral is compressed and when the cable output 45 rotates back, it is again pushed against the outer jacket of the rotary line feeder 39. It is supported by the pivot clips 47, which are mounted by means of a bearing pin 66 in the rotary feeder cover 59. When the power lines are spread out, there are somewhat less than four spiral turns, and when compressed, there are somewhat more than five spiral turns. The number of spiral turns is determined by the thickness and rigidity of the power lines and by the maximum possible diameter of the lower rotary line feeder 39, which is fastened to the rotation transmission 38 by means of bolts 53a and has a rotary feeder cover 59, as shown in FIG. 9.

In the above-mentioned upper rotary line feeder 51, the cables 10 and the hose line 11 arrive in the vicinity of a mount 57 for the rotary line feeder 51, where they are fastened by means of clamps 56. They are fastened above one another with additional clamps 56 to a flat profile elastic band 55, and are guided together with the latter in a spiral shape to an opening 74 of a winding drum 58, which is connected rotationally with the rotation tube 8. From the center of the winding drum 56, some of the cables 10 lead to the motors 6 and 7. Other cables 10 and the hose line 11 lead through the protective tube in the center of the rotating tube 8 via cable connectors 42 to the lower rotary line feeder 39.

The elastic band 55 with the cables 10 and the hose line 11 is also connected to a mounting 73 fastened to the floor 81 of the rotary line feeder 51, and is then guided to the inside of a bearing pin 71 fastened on the floor 81 with a swiveling point 72 and to the outside of several spacer elements 69 along the opening 74. Between the guide points, the spiral slides with sliding elements 70 fastened with clamps 56 on the floor 81, as also shown in FIG. 2. (Numbers 69 and 73 in FIG. 2 are not shown in the same position as in FIG. 3, but in a position which shows them more clearly.)

The rotary line feeder 51 is equipped with a cover 68. The floor of the winding drum 58 slides by means of friction bearings 75 over the floor 81 of the rotary line feeder 51 and projects with a bearing bushing 78 into a driver bushing 76, and is connected by means of driver bolt 77. The driver bushing 76 is connected by means of pipes 60 with the rotary plate 18 of the rotating tube 8.

As shown in FIG. 10, nine different robot variants can be produced by fixing or omitting additional axes. In FIG. 10:

| FIG. | Rotating Tube 8 | Pivot Fork 23 | Connector 3 |
|---|---|---|---|
| 10.1 | Rotates | Movable | Itself rotates |
| 10.2 | Rotates | Movable | Follows |
| 10.3 | Rotates | | Follows |
| 10.4 | | Movable | |
| 10.5 | | Movable | Itself rotates |
| 10.6 | | | Itself rotates |
| 10.7 | Rotates | Angled | Itself rotates |
| 10.8 | | Angled | Itself rotates |
| 10.9 | Rotates | Angled | |

As seen in FIGS. 1 through 10, the preferred robot arm basically includes a connector device for connecting the robot arm to equipment comprising at least one member of the group consisting essentially of a tool, a workpiece, a workpiece gripper and a gripper change system. There is included an apparatus for powering the one member and an arrangement for directly rotating the connector about a first axis of rotation, P. A similar arrangement for swiveling the connector device is connected to the arrangement for directly rotating the connector device about a second axis of rotation, E. There is also an apparatus for rotating the direct rotating arrangement and the swivel arrangement about a third axis of rotation, D. The arrangement for rotating about axis P, the arrangement for swivelling about axis E, and the apparatus for rotating about axis D are all disposed so that all three axes P, E and D intersect at substantially a common intersection point. More specifically, the E axis swivelling arrangement comprises a swivel head, the D axis rotary arrangement comprises a column 2, and the connector device comprises a connector 3. The connector 3 is disposed at one end of the column 2. The column 2 has a swivel motor disposed on an end thereof opposite the connector 3 with the swivel motor having gear wheels mounted to swivel the swivel head along the E axis.

The robot arm includes the column 2 and a roller guide 1 for holding the column 2. The column 2 is disposed to move within the roller guide 1. The column 2 has a rotation tube 8 disposed within the column 2 which rotation tube 8 is rotatable around the D axis which is vertically disposed. A rotation motor 5 mounted on the column 2 is disposed to rotate the rotation tube 8. The swivelling head comprises a rotation fork 19 and a swivelling fork 23 for attaching the connector 3 thereto.

As best seen in FIGS. 1 and 4, the arrangement for swivelling the connector 3 and the arrangement for rotating the connector 3 include the toothed belts 27, 32. A gear wheel 26 driven by tooth belt 27 swivels the swivelling fork 23 with the connector 3 mounted thereon. The gear wheel 26 is in the swivelling axis E and is fastened to an input shaft 25 of a reducer transmission 24 whose housing is fastened by bolts 52 to the rotation fork 19 and whose output side is connected via bolts 52a with an arm 23a of the swivelling fork 23 designed as a bolt-on flange.

The preferred robot arm further includes a gear wheel 31 driven by the toothed belt 32 to rotate the output end of the connector 3 which gear wheel 31 is in the swivelling axis E and is fastened on an input shaft of an angular transmission 29. The output of the angular transmission 29 lies in the P axis of the connector 3 and is connected with one drive end of a rotation transmission 38. The housing of the rotation transmission 38 is fastened by bolts 53 in the flange end 23b of the swivelling fork 23 and the output end of the rotation transmission 38 is fastened by bolts 53a to the connector 3.

The rotation fork 19 has two ends having flange holes 22, 22a for mounting the swivelling fork 23 coaxial to the swivelling axis E. The swivelling fork 23 is mounted on the side opposite the reducing transmission 24 with a bearing 36 in a flange hole 22. The bearing 36 is covered on one side with an inner swivelling flange 34 bolted to the swivelling fork 23 and on the other side by a support flange 35 enclosing the swivelling flange 34 and bolted to the rotation fork 19.

The rotation fork 19 is connected with the rotating tube 8 and is mounted by two bearings 20 in the connection end 21 of the column 2. As seen in FIGS. 2 and 4, the rotating tube 8 is a light alloy metal tube. One end of the tube 8 includes fitted keys 8a in grooves in the connection tube 12 and the other end of the tube includes connecting bolts and fitted keys 8a in grooves 19b of the flange 19a of the rotation fork 19 to provide a non-floating engagement with the bolted add reinforced rotation fork 19.

As best seen in FIGS. 1 and 2, the drive for the axis D to rotate the rotation fork 19 is a rotation motor 5 fastened to a fixed flange 4 and located between the motors 6, 7 and the connector 3. They are connected in a non-floating manner by a toothed belt 16 and toothed wheels 15, 17 by a turntable 18. The connection tube 12 and the rotating tube 8 being centered inside the turntable 18 with the rotation fork 19.

As best seen in FIG. 1, the robot arm includes power lines 10, 11 which lead from a connection point 48 behind a mounting 49 as a loop 50 extends to an upper rotary line feeder 51 and to the rotation motor 5. As best seen in FIGS. 1, 2 and 4, the power lines from the rotary feeder 51 first lead to a connection point 54 and then through a protective tube 9 located in the center of the rotating tube 8. From the protective tube 9, the power lines continue through an opening in the swivelling fork 23 and in the swivelling flange 34 to a lower rotary line feeder 39 on the rotation transmission 38 located on the connector 3.

As best seen in FIG. 1, the robot arm includes power lines 10, 11 which lead from a connection point 48 behind a mounting 49 as a loop 50 extends to an upper rotary line feeder 51 and to the rotation motor 5. As best seen in FIGS. 1, 2 and 4, the power lines from the rotary feeder 51 first lead to a connection point 54 and then through a protective tube 9 located in the center of the rotating tube 8. From the protective tube 9, the power lines continue through an opening in the swivelling fork 23 and in the swivelling flange 34 to a lower rotary line feeder 39 on the rotation transmission 38 located on the connector 3.

As best seen in FIG. 1, there may be horizontal and/or vertical use of the robot arm and an associated need to guide the power and control lines 10, 11 between the connection point 48 or the mounting 49 on the roller guide 1 and the upper rotary line feeder 51. Depending on the application, the power and control lines 10, 11 can pass in a loop through a rigid guide 80, which is then connected with the roller guide 1 so that it can move in a linear fashion.

As best seen in FIGS. 1 and 4, the lower rotary line feeder 39 surrounds the rotation transmission 38 and is fastened to it by bolts 53a.

As best seen in FIGS. 2, 3, 4, 7, 8 and 9, the power lines lie on top of one another in one or both of the rotary line feeders 39, 51, and, in the lower rotary line feeder 39, are separated from one another by spacer rings 43. In each of the preferred feeders 39, 51, the power lines 10, 11 are laid in several spirals, and the annular cross section of the rotary feeders 39, 51 is wide enough to allow relative rotation of more than 360 degrees. The outside diameter of each of the rotary feeders 39, 51 is large enough so that it can hold four spiral turns. The inside of each of the rotary feeders 39, 51 is small enough so that it can hold more than five spiral turns.

As best seen in FIGS. 4, 7, 8 and 9, the power lines on the inside cable output 45 of the spiral of the lower rotary line feeder 39 are connected with a two-piece pivot clip 47 which is mounted by a bearing pins 66 in the lower rotary line feeder cover 59. The bearing pin 66 is parallel to the axis of rotation P so that it can swivel. Each hose line 11 in the vicinity of the lower rotary line feeder 39 is made of PTEF or a synthetic material with a similarly low coefficient of friction. Each cable 10, at least in the vicinity of the lower rotary line feeder 39 has an external skin which is preferably of PAF or synthetic material with a similarly low coefficient of friction, e.g., PTFE. Inside the cable 10 there is preferably insulation and lubrication material, e.g., foamed PTFE with air bubbles. The preferred cables 10 have an oval cross section and are laid in the vicinity of the lower rotary line feeder 39 so that the larger cross section height is in the direction of the axis of rotation P.

Figure 3:
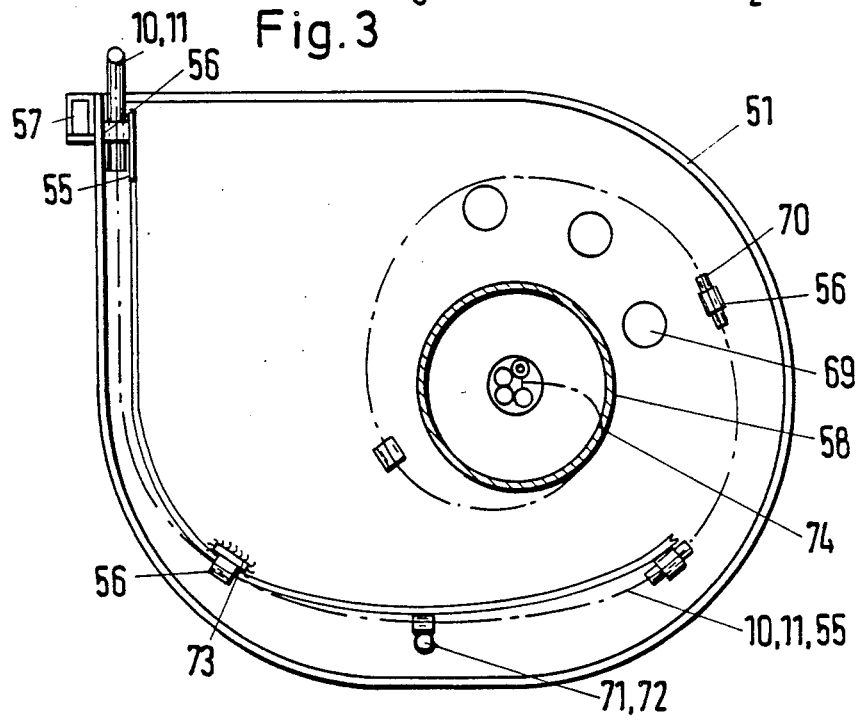
FIG. 3 shows an overhead view of the rotary line feeder shown in FIG. 2.

As best seen in FIGS. 1, 2, and 3, the power lines 10, 11 of the upper rotary line feeder 51, which is opposite the connector 3 on the column 2, are supported on an elastic band 55 by clamps 56 to achieve at least a 360 degree rotation. The outer end of this elastic band 55 is held by a bearing pin 71 and a pivot point 72 and by a mounting 73 and/or a mounting 57 connected with the fixed flange 4. There is at least one spacer element 69 preferably in the form of a roller with an elastic jacket between the spiral turns of the elastic band 55. At least one of the clamps 56 is equipped with a slide element 70 to slide on a floor 81 of the upper rotary line feeder 51. The floor 81 of the upper rotary line feeder 51 is equipped coaxial to the longitudinal axis D of the column 2 above and below with friction bearings 75 for a lower driver bushing 76 and an upper winding drum 58 which is connected by a driver bolt 77 secured with the driver bushing 76.

As generally seen in FIG. 1, between the upper rotary line feeder 51 and the lower rotary line feeder 39 there are cable connectors 42 for the various cables 10. In FIGS. 1, 4 and 6, at the lower end of the protection tube 9, a swivelling bushing 67 is held by a bearing bushing 78 and its holes are larger than the power lines passing through them so that they can move freely in the longitudinal direction at the lower end of the protection tube 9. Additionally, in FIGS. 1 and 4, the connector 3 has a centering flange to fasten a changer system 61 on the side opposite the output shaft 40 by an arrangement of installation points to hold monitoring equipment, e.g., pressure monitors 63a, valves 63a, valves 63b and a connection point 64 for the connections of the power lines 10, 11 which are covered by a protective jacket 82 in the form of an elastic band.

The invention as described hereinabove in the context of the preferred embodiments is not to be taken as limited to all o the provided details thereof, since modifications and variations thereof may be made without departing from the spirit and scope of the invention.

What is claimed is:

1. A robot arm for positioning equipment including a tool, a work piece, a work piece gripper, a gripper change system or the like, said robot arm comprising:
   a column having a central axis and a first end, a second end and an intermediate region therebetween;
   means for supporting said column;
   a support element mounted for rotation within said column;
   said support element including a first end and a second end respectively corresponding to said first end and said second end of said column;
   means for selectively rotating said support element about said central axis relative to said column;
   said means for selectively rotating being located at said first end of said support element and at said first end of said column;
   pivot means having a first end and as second end;
   means for pivotally connecting said second end of said pivot means to said second end of said support element for relative rotation therebetween about a pivot axis which is perpendicular to said central axis;
   said pivot axis extending through said central axis at a common point;
   a connector for supporting the equipment;
   said connector being rotatably mounted at said first end of said pivot means for rotation about a connector axis;
   said connector axis being perpendicular to said pivot axis;
   said connector axis extending through said pivot axis at said common point;
   pivot drive means including: a pivot motor rigidly mounted to said first end of said support element, a first gear wheel supported by said second end of said support element at said pivot axis for rotation of said pivot means about said pivot axis, and first tooth belt drive means extending between said pivot motor and said first gear wheel; and
   connector drive means including: a connector drive motor rigidly mounted to said first end of said support element, a second gear wheel supported by said pivot means at said pivot axis for rotation of said connector about said connector axis, and second tooth belt drive means extending between said connector drive motor and said second gear wheel.

2. The robot arm as set forth in claim 1, wherein said means for supporting said column includes column support structure and said column is mounted to said column support structure for axial movement along said intermediate region of said column to cause said column to be selectively extendible relative to said column support structure.

3. The robot arm as set forth in claim 1, wherein said means for selectively rotating said support element about said central axis relative to said column includes: a support element drive motor rigidly mounted to said first end of said column, a third gear wheel coaxially aligned with said central axis and secured about said first end of said support element, and third tooth belt drive means between said support element drive motor and said third gear wheel.

4. The robot arm as set forth in claim 1, wherein said support element is tubular and each of said first tooth drive belt means and said second tooth drive belt means includes a major portion which extends within said support element.

5. The robot arm as set forth in claim 1, further including a first reduction gear means having a housing, an input side, and an output side, wherein said housing is rigidly connected to said pivot means, said input side is coupled to said second gear wheel, and said output side is connected to said connector for rotation thereof about means, said input side is coupled to said second gear wheel, and said said connector axis.

6. The robot arm as set forth in claim 1 wherein said means for pivotally connecting said second end of said pivot means to said second end of said support element includes a second reduction gear means having a housing, an input side, and an output side; said housing is rigidly connected to said second end of said support element; said input side is coaxially aligned with said pivot axis and has said first gear wheel rigidly mounted thereon; and said output side is coaxially aligned with said pivot axis and is rigidly connected to said second end of said pivot means.

7. The robot arm as set forth in claim 6, wherein said second end of said support element includes a first fork, said second end of said pivot means includes a second fork, each of said first fork and said second fork includes a first leg and a second leg, said second reduction gear means is located at said first leg of said first fork and at said second leg of said second fork, each of said second leg of said first fork and said second leg of said second fork has an opening therethrough, said openings are coaxially aligned, said second leg of said first fork and said second leg of said second fork have first bearing means mounted therebetween, said first bearing means generally surrounds said openings, and each of said openings and said first bearings means are coaxially aligned with said pivot axis.

8. The robot arm as set forth in claim 7, wherein said first gear means and said second gear means are located between said first leg and said second leg of each of said first fork and second fork.

9. The robot arm as set forth in claim 7, wherein said support element includes an intermediate region formed of a tube having a first end and a second end, said first fork is secured to said second end of said tube, and said support element is at least partially supported by a second bearing means between said first fork and said column.

10. The robot arm as set forth in claim 9, wherein said first end of said support element includes collar means secured to said first end of said tube, said collar means supports said third gear wheel, and said support element is at least partially supported by a third bearing means between said collar means and said column.

11. The robot arm as set forth in claim 10, wherein said tube is a light alloy metal, said first end of said tube is keyed to said collar means, said second end of said tube is keyed to said first fork, said collar means and said first fork are axially joined to said tube during assembly of said support element within said column.

12. The robot arm as set forth in claim 2, further including power supply means on said column support structure, an upper rotary line feeder supported by said column above said first end of said support element and said pivot motor and said connector drive motor mounted thereto, power line means connected to said power supply means, wherein said power line means extends from said power supply means in a loop to said means for selectively rotating said support element and to said upper rotary line feeder.

13. The robot arm as set forth in claim 7, further including an upper rotary line feeder supported by said column above said first end of said support element and said pivot motor and said connector drive motor mounted thereto, said upper rotary line feeder having an inlet located at a peripheral region thereof which is capable of receiving operating power and an outlet located generally inwardly of said inlet near a central region of said upper rotary line feeder, a protective tube mounted along said central axis and extending through said support element to have a first end of said protective tube at said first end of said support element and a second end of said protective tube at said second end of said support element, power line means connected to said outlet of said upper rotary line feeder and extending to said pivot motor and said connected drive motor and into said first end of said protective tube, and said power line means extending through said protective tube to exit at said second end thereof and through each of said openings in said second leg of said first fork and said second leg of said second fork to provide said operating power to said equipment.

14. The robot arm as set forth in claim 13, further including a lower rotary line feeder centrally mounted on said second fork around said connector, said lower rotary line feeder having an inlet adjacent said second leg of said second fork and an outlet near a central region of said lower rotary line feeder adjacent said connector, wherein said power line means is connected to said inlet of said lower rotary line feeder and said outlet provides said operating power to said equipment.

15. The robot arm as set forth in claim 14, wherein each of said upper rotary line feeder add said lower rotary line feeder includes internal power line means, said internal power line means is in the form of several spirals from said inlet to said outlet, and each of said upper rotary line feeder and said lower rotary line feeder has an annular cross-section containing said several spirals therein to allow rotation of said outlet relative to said inlet of at least 360 degrees.

16. The robot arm as set forth in claim 15, wherein said annular cross-section of each of said upper rotary line feeder and said lower rotary line feeder includes an outside diameter and an inside diameter, said outside diameter is large enough to accommodate up to four spiral turns of said several spirals, and said inside diameter is small enough to accommodate at least five aspiral turns of said several spirals.

17. The robot arm as set forth in claim 15, wherein said internal power line means of said upper rotary line feeder includes at least one cable and at least one hose and each of said several spirals includes said at least one cable and said at least one hose being axially aligned in a side-by-side manner relative to said central axis.

18. The robot arm as set forth in claim 15, wherein said internal power line means of said lower rotary line feeder includes at least one cable and at least one hose and each of said several spirals includes said at least one cable and said at least one hose being axially aligned in a side-by-side manner relative to said connector axis and further including at least one radially extending spacer ring between axially adjacent said several spirals of said at least one hose and of said at least one cable.

19. The robot arm as set forth in claim 15, wherein said internal power line means of said lower rotary line feeder at said outlet thereof is supported by a pivot clip, said pivot clip is pivotally mounted to an interior of said lower rotary line feeder by a bearing pin and said bearing pin is parallel with said connector axis.

20. The robot arm as set forth in claim 15, wherein said upper rotary line feeder includes an elastic band means located therein, said elastic band means is in a form corresponding to said several spirals, said internal power line means is secured by a plurality of clamps to said elastic band means for support of said internal power line means by said elastic band means, and said elastic band means with said internal power line means secured thereon is secured by rigid mounting means to an interior of said upper rotary line feeder.

21. The robot arm as set forth in claim 20, wherein said elastic band means is pivotally supported on a bearing pin secured to said interior of said upper rotary line feeder at a portion of said several spirals adjacent to said rigid mounting means and remote from said inlet.

22. The robot arm as set forth in claim 20, wherein said upper rotary line feeder includes a plurality of spacer elements mounted to said interior thereof, at least one of said spacer elements is located between adjacent spiral turns of said several spirals, said spacer element has a roller mounted thereon, and said roller provides rolling contact with said spiral turns during said rotation of said outlet relative to said inlet.

23. The robot arm as set forth in claim 20, wherein said upper rotary line feeder includes a floor and at least one of said clamps includes a slide element at said floor for sliding contact between said slide element and said floor during said rotation of said outlet relative to said inlet.

24. The robot arm as set forth in claim 23, further including a support element extension coaxially aligned with said central axis and secured to said first end of said support element for rotation therewith, wherein said floor of said upper rotary line feeder includes a central opening therethrough, said support element extension extends through said central opening, and said outlet is provided in an upper region of said support element extension.

25. The robot arm as set forth in claim 24, wherein said floor of said upper rotary line feeder is supported around said central opening by friction bearing means mounted to said support element extension.

26. The robot arm as set forth in claim 14, wherein said protective tube includes rotary bushing mean in said second end thereof to allow limited rotation and limited longitudinal movement of said power line means relative to said second end of said support tube.

27. The robot arm as set forth in claim 26, wherein at least a portion of said power line means extends through said rotary bushing means and through each of said openings in said second leg of said first fork and said second leg of said second fork to said inlet of said lower rotary line feeder and includes an external surface having a relatively low coefficient of friction.

28. The robot arm as set forth in claim 13, further including means for monitoring and controlling said operating power to said equipment, wherein said means for monitoring and controlling is mounted on said connector.

* * * * *